United States Patent Office 2,724,655
Patented Nov. 22, 1955

2,724,655

METHOD OF DENSIFYING LIGHT MAGNESIA AND OF CEMENTS CONTAINING IT

Julian C. Williams, Freeport, Tex., assignor to The Dow Chemical Company, Midland, Mich., a corporation of Delaware No Drawing. Application November 19, 1952,
Serial No. 321,523

6 Claims. (Cl. 106—106)

This invention relates to a process for densifying light magnesia and magnesium oxychloride cements containing it. It also concerns the products so prepared.

Magnesia is produced commercially by calcining either of two main raw materials, magnesite and magnesium hydroxide. The former is mined from natural deposits, but the latter is commonly prepared by alkalizing seawater or other magnesian brine. For some purposes the magnesia from the two sources is equivalent. However, in the manufacture of magnesium oxychloride cement, the calcined magnesite has been much preferred. In particular, the degree of fineness of calcined magnesite may be controlled at any desired value by the extent to which the magnesite is ground. Particle sizes from 10 to 200 microns are common. On the other hand, the fineness of the magnesia from precipitated magnesium hydroxide is not easily regulated, being determined by the size of the hydroxide particles formed during precipitation. Most of the particles are no more than 0.1 micron in diameter, and many are much smaller. They may in part be agglomerated into loose skeleton-like aggregates, but these behave like the individual particles during cement-forming reactions.

It is this difference in particle size which is thought to account for the difficulties in making satisfactory oxychloride cements from the light magnesias made from seawater and other brines. Whatever the reason, the activity of the magnesia, if lightly burned, is so great that cement made from it attains its initial set too rapidly. However, if the activity is reduced by a heavier burning, the properties of the final cement may be unsatisfactory. Further, the cements, unless compounded with unusual care, may exhibit excessive shrinkage on setting. These undesirable effects may be overcome in part by blending several grades of the magnesia, or by putting modifying chemicals in the cement. However, such procedures add their own complexities, and have met with but limited acceptance.

It has now been found these measures are unnecessary and that light magnesia from seawater or other brines may be rendered suitable, and even highly advantageous, for use in oxychloride cements by a simple physical treatment to densify it. This treatment consists essentially in tumbling the magnesia together with inert heavy objects for a time sufficient to cause a substantial increase in its bulk density. The tumbling produces no significant grinding of the magnesia, presumably because the particles are already very fine. Instead, the repeated blows from the heavy objects simply compact the particles together. Probably the skeleton-like aggregates of fine particles are collapsed, allowing the particles to crowd into a smaller volume. There may also be some aggregation of the particles into dense clusters. In any case, there is a marked rise in the apparent density of the magnesia.

As a result of the treatment, the magnesia is rendered eminently suitable for use in oxychloride cements. Initial setting characteristics of the cement are excellent and there is no troublesome shrinkage. At the same time, ultimate strengths are realized after aging which are much higher than those obtained from the best cements made from calcined magnesite.

So far as known, the densification treatment according to the invention may advantageously be applied to any light magnesia prepared by calcining magnesium hydroxide precipitated by alkalizing a magnesian brine. It is particularly useful with the extremely light magnesias made by calcining at 400° to 700° C. for 0.5 to 3 hours the magnesium hydroxide precipitated by the treatment of seawater with an aqueous solution of calcium hydroxide or sodium hydroxide. Typical precipitation processes of this character are described in U. S. Patents 2,405,055 and 2,479,138. The calcined light magnesias produced from such sources ordinarily have a bulk density of 15 to 30 pounds per cubic foot. By the treatment of the invention this bulk density is easily increased to 50 to 60 pounds per cubic foot.

The tumbling operation according to the invention is most conveniently carried out by charging the magnesia and a considerable number of small heavy objects into a sturdy cylindrical vessel mounted for rotation about its axis in a horizontal plane. The vessel is then rotated at less than the critical speed, so as to cause repeated tumbling of the contents. A conventional ball mill is quite satisfactory, though any form of tumbling mill may be used. The mill should be capable of being closed, so that moisture can be excluded. Operation is at ordinary temperature.

Almost any type of heavy object chemically inert to the magnesia may be used to produce the necessary impact in the tumbling operation. However, smoothly rounded objects, such as the conventional balls and rods used in tumble mills, tend to become coated with magnesia and lose efficiency. It is therefore much preferred that the mill be charged with sharp-edged metal objects. These latter, because of their edges, are self-cleaning and also tend to keep the walls of the mill scraped clean. Thus, commercial mill stars may advantageously be used. However, very good results have been realized with miscellaneous small pieces of scrap steel, particularly short lengths of angle iron. An ideal filling consists of sharp-edged squares of steel plate.

In practice, the mill should be nearly half filled with the charge of heavy metal objects. The magnesia to be densified is then added in about the maximum volume which the mill will handle without causing the magnesia to pack on the metal charge and the walls. Ordinarily, an initial volume of oxide somewhat less than that of the metal charge is used. The mill is then closed and rotated at a rate such as to cause thorough tumbling activity. Rotation is continued until the bulk density of the magnesia no longer increases significantly. This point may be determined by periodically withdrawing a sample of the oxide and measuring its bulk density. It is desirable to stop the tumbling as soon as maximum density is reached. In most cases, a tumbling time of 0.5 to 2 hours is sufficient. At the end of this period, the magnesia is discharged from the mill in conventional manner and is ready for packaging or for immediate use in formulating oxychloride cement mixtures.

The invention has thus far been described as being directed to the densification of light magnesia alone. However, it is equally applicable to densifying such magnesia in admixture with other materials with which there may be occasion to mix it. In this aspect, the invention provides an excellent method of making a ready-mixed composition for making oxychloride cement.

In this connection, it should be explained that in commercial practice oxychloride cement is mixed on the job just before use. To this end, the user blends together magnesia, aggregate, e. g. sand, filler, such as silica flour and asbestos fiber, and a gauging solution of magnesium chloride in water. Attempts have been made to formulate ready-mixed compositions containing all the ingredients other than water, but they have not proved successful, mainly because of the difficulty of securing an adequate blend of the dry ingredients. These difficulties may be overcome by the tumbling process already described.

In making a ready-mix oxychloride cement according to the invention, there are mixed together light calcined magnesia derived from seawater or other magnesian brine, solid magnesium chloride, and conventional filler in cement-forming proportions. This mixture is then tumbled with inert heavy objects in the substantial absence of moisture for a time sufficient to insure uniform mixing and to cause a substantial increase in the bulk density of the mixture. The resulting product is an acceptable premixed composition for making oxychloride cement. In use, it requires only the addition of water, or of water and inert aggregate, as the user prefers.

The physical chemistry involved in blending the premixed cement is quite obscure. However, it is believed that something more than mere intimate mixing of the ingredients occurs. Apparently when the mixing takes place in the presence of light magnesia which is undergoing densification by impact, the solid magnesium chloride is also affected. Whatever the explanation, the product is a far superior ready-mixed cement-forming composition to any heretofore available.

In making the ready-mixed composition, the light magnesia used is that characterized above, prepared by calcining precipitated magnesium hydroxide below 700° C. and having a bulk density less than 30 pounds per cubic foot. The solid magnesium chloride is preferably supplied as flakes of magnesium chloride hexahydrate, and is advantageously ground separately to a powder before mixing with the magnesia. Silica flour and asbestos fiber are the customary fillers. Pigment may be added if desired. These are all mixed in conventional cement-forming proportions, the values of which are well-known and form no part of this invention. For illustration, however, a good mixture may contain, on a weight basis, one part of the magnesia, from 0.70 to 1.50 part of powdered magnesium chloride, 0.30 to 0.60 part of silica flour, and 0.00 to 0.15 part of asbestos fiber. These ingredients are individually loaded into the tumbling mill, and the latter is then swept out with a dry gas to exclude moisture, and the mill is closed. The whole is then set to tumbling for a period sufficient to insure good pulverization of the magnesium chloride flakes and uniform mixing of the ingredients, and to increase the bulk density of the mixture to at least 50 pounds per cubic foot.

In making the ready-mixed product, the temperature of the material undergoing tumbling should be prevented from going over 100° F., and is preferably maintained below 80° F. Serious overheating may cause the mixture to set in the mill, and even slight overheating adversely affects the storage life of the ready-mix and the properties of the final set cement. The tumbling should be stopped as soon as adequate mixing and densification are achieved, usually after about 30 minutes.

After tumbling, the product is discharged from the mill and stored in moisture-proof containers. In use, the ready-mix composition is simply blended with water to the desired working consistency and is troweled, cast, or otherwise shaped to final form in the customary way. If desired, inert aggregate, such as sand, may be added to the pre-mix and water at the time of blending.

The following examples will further illustrate the invention but are not to be construed as limiting its scope.

*Example 1*

A light magnesia was prepared by first precipitating magnesium hydroxide from decarbonated seawater by the addition of sodium hydroxide solution. The resulting precipitate, after washing, was calcined at 600° C. for 2 hours to form a light magnesia having a bulk density of 30 pounds per cubic foot. A 35 pound charge of this magnesia was introduced into a stone-line ball mill having an inside diameter of 1.6 feet and a volume of 4.75 cubic feet. At the same time, about 400 pounds of sharp edged square steel plates about 1 x 2.5 x 2.5 inches in size were introduced to fill the mill about half full. The mill was then rotated at 51 revolutions per minute for a period of 0.5 hours. At the end of this time, the magnesia was discharged from the mill. It had a bulk density of 52 pounds per cubic foot.

In comparative tests, samples of the magnesia before and after the tumbling treatment were used in making magnesium oxychloride cement according to the standard test procedures published by the Oxychloride Cement Association. (See also Amer. Soc. Test. Mat. Specs. C 244–50 T to C 257–50 T.) In each case 100 parts by weight of the magnesia were mixed thoroughly with 50 parts of silica flour, 10 parts of asbestos fiber, and 173.3 parts of standard 20 x 30 Ottawa sand. The resulting mixture was then mixed with a sufficient quantity of aqueous magnesium chloride gauging solution (22° Bé.) to make a cement slurry having a consistency corresponding to a standard flow-table slump of 8 inches. For each gram of the mixture made with the untreated magnesia, 0.50 cc. of gauging solution was required to give the standard consistency. However, with the mixture containing the densified magnesia only 0.45 cc. of gauging solution was required per gram.

Each of the resulting slurries was then cast and allowed to set and various physical properties of the set cement were determined, all according to the standard procedures. The values were

|  | Untreated Magnesia | Densified Magnesia |
| --- | --- | --- |
| Initial setting time (hours) | 1.97 | 1.93 |
| Final setting time (hours) | 3.18 | 3.07 |
| Volume change in 7 days (percent) | −0.022 | −0.018 |
| Transverse strength—1 Day (pounds per square inch) | 1,520 | 1,640 |
| Transverse strength—28 Days (pounds per square inch) | 1,550 | 2,200 |

From the data it will be apparent that the densified magnesia, when being made into a cement, required less gauging solution and produced a set cement of negligible shrinkage and exceptional strength.

*Example 2*

A premixed cement-forming composition was prepared according to the invention using light magnesia prepared by calcining seawater magnesium hydroxide at 650° C. for 3 hours. This magnesia had a bulk density of 35 pounds per cubic foot. Into the mixer of Example 1 there were charged the load of the sharp-edged metal plates and a total of 35 pounds of cement-forming ingredients in the following proportions by weight:

|  | Per cent |
| --- | --- |
| Magnesia | 40.0 |
| Magnesium chloride (Hexahydrate flake) | 37.0 |
| Silica flour | 19.2 |
| Asbestos fiber | 3.8 |

The mixer was then flushed out with dry air, closed, and rotated at 51 revolutions per minute for 0.5 hour. At the end of this time, the mixer was emptied, and the ready-mix cement was packaged. It had a bulk density of 54 pounds per cubic foot.

A cement was prepared by mixing 2,750 parts by weight of this ready-mix composition with 1,906 parts of sand and 816 parts of water. The properties of the cement were determined by the standard procedures referred to in Example 1. They were:

| | |
|---|---|
| Consistency (flow table—inches) | 10 |
| Initial setting time (hours) | 2.77 |
| Final setting time (hours) | 4.93 |
| Volume change in 1 day (per cent) | 0.200 |
| Volume change in 7 days (per cent) | +0.022 |
| Transverse strength, p. s. i. (1 day) | 1,290 |
| Transverse strength, p. s. i. (28 days) | 2,010 |

A large number of batches of this premixed composition were used in laying an oxychloride cement floor. The floor has given satisfactory service, and shows no signs of shrinkage cracks or other defects.

What is claimed is:

1. A method of densifying light magnesia prepared by calcining magnesium hydroxide precipitated by alkalizing a magnesian brine which comprises tumbling the magnesia together with tumbling inert heavy objects for a time sufficient to cause substantial increase in its bulk density.

2. A method of densifying light magnesia prepared by calcining at a temperature below 700° C. magnesium hydroxide precipitated by alkalizing seawater and having a bulk density below 30 pounds per cubic foot which comprises tumbling the magnesia together with tumbling sharp-edged heavy metal objects for a period of at least one-half hour sufficient to increase its bulk density to more than 50 pounds per cubic foot.

3. Densified magnesia prepared by the process of claim 2.

4. A method of preparing a ready-mix oxychloride cement from light magnesia prepared by calcining magnesium hydroxide precipitated by alkalizing a magnesian brine which comprises mixing together the magnesia, solid magnesium chloride, and filler in cement-forming proportions, and tumbling the mixture together with tumbling inert heavy objects in the substantial absence of moisture for a time sufficient to insure uniform mixing and to cause a substantial increase in the bulk density of the mixture.

5. A method of preparing a ready-mix oxychloride cement from light magnesia prepared by calcining at a temperature below 700° C. magnesium hydroxide precipitated by alkalizing seawater and having a bulk density below 30 pounds per cubic foot which comprises mixing together the magnesia, magnesium chloride hexahydrate flakes, and silica flour, in cement-forming proportions, and tumbling the mixture together with tumbling sharp-edged heavy metal objects in the substantial absence of moisture for a period of at least one-half hour sufficient to insure pulverization of the hexahydrate flakes and uniform mixing of the components and to increase the bulk density of the mixture to at least 50 pounds per cubic foot.

6. A premixed composition for producing magnesium oxychloride cement prepared by the process of claim 5.

References Cited in the file of this patent

UNITED STATES PATENTS

| | | |
|---|---|---|
| 1,907,076 | Martin | May 2, 1933 |
| 2,041,088 | Pfirrmann | May 19, 1936 |
| 2,082,362 | Stevens | June 1, 1937 |
| 2,185,158 | Price | Dec. 26, 1939 |
| 2,234,367 | Chesny | Mar. 11, 1941 |
| 2,399,987 | Cordie et al. | May 7, 1946 |
| 2,468,321 | Bland | Apr. 26, 1949 |

FOREIGN PATENTS

| | | |
|---|---|---|
| 29,212 | Great Britain | of 1896 |
| 19,579 | Great Britain | of 1898 |